(12) United States Patent
Kuo

(10) Patent No.: US 7,073,420 B2
(45) Date of Patent: Jul. 11, 2006

(54) HYDRAULIC CUTTING DEVICE FOR CUTTING A RAW ALUMINUM MATERIAL

(75) Inventor: Chu-Hsiung Kuo, Sanchung (TW)

(73) Assignee: Hsung Huei Industrial Co., Ltd., Taipei Hsien (TW)

( * ) Notice: Subject to any disclaimer, the term of this patent is extended or adjusted under 35 U.S.C. 154(b) by 119 days.

(21) Appl. No.: 10/424,915

(22) Filed: Apr. 29, 2003

(65) Prior Publication Data

US 2004/0216573 A1   Nov. 4, 2004

(51) Int. Cl.
  *B23D 33/02*   (2006.01)
  *B26D 3/16*   (2006.01)
  *B26D 7/02*   (2006.01)
  *B26D 7/06*   (2006.01)
  *B26D 7/28*   (2006.01)

(52) U.S. Cl. .................. 83/112; 83/156; 83/196; 83/198; 83/206; 83/277; 83/419; 83/421; 83/436.45

(58) Field of Classification Search .......... 83/15, 83/16, 23, 111, 112, 123, 156, 170, 182, 183, 83/196–200, 206, 276–278, 319, 419, 421, 83/436.3, 436.4, 436.45; 72/203, 254, 255, 72/270; 198/345.1
See application file for complete search history.

(56) References Cited

U.S. PATENT DOCUMENTS

| | | | | | |
|---|---|---|---|---|---|
| 4,152,959 A | * | 5/1979 | Elhaus | .................. | 83/123 |
| 4,205,569 A | * | 6/1980 | Horn et al. | .............. | 83/183 X |
| 4,334,421 A | * | 6/1982 | Ostlinning et al. | ........... | 72/257 |
| 4,526,073 A | * | 7/1985 | Elhaus | .................. | 83/15 |
| 4,651,602 A | * | 3/1987 | Harrold et al. | ............. | 83/15 |
| 4,677,838 A | * | 7/1987 | Bessey et al. | ........... | 83/170 X |
| 4,727,787 A | * | 3/1988 | Schlosser | ............. | 83/436.3 X |
| 4,787,281 A | * | 11/1988 | Gardner | ................. | 83/15 |
| 5,062,336 A | * | 11/1991 | Elhaus | .................. | 83/198 |
| 5,353,910 A | * | 10/1994 | Harris et al. | ........... | 198/345.1 |
| 6,698,159 B1 | * | 3/2004 | Harris et al. | .................. | 83/247 |

FOREIGN PATENT DOCUMENTS

| | | | | |
|---|---|---|---|---|
| JP | 57-132913 | * | 8/1982 | ........... 83/170 |
| JP | 63-84813 | * | 4/1988 | ........... 72/270 |

* cited by examiner

*Primary Examiner*—Clark F. Dexter
(74) *Attorney, Agent, or Firm*—Rosenberg, Klein & Lee

(57) ABSTRACT

A hydraulic cutting device for a raw aluminum material includes an input tract for transporting the raw aluminum material to a cutting seat to be cut by the incorporation of a movable cutting block and a fixed cutting block. A measuring device is provided to measure the length of the raw aluminum material being cut. After the raw aluminum material is cut, an output cylinder is activated to transport the cut raw aluminum material to an output tract which is driven by a motor via a chain.

2 Claims, 6 Drawing Sheets

HYDRAULIC CUTTING DEVICE FOR CUTTING A RAW ALUMINUM MATERIAL

BACKGROUND OF THE INVENTION

1. Field of the Invention

The present invention relates to a hydraulic cutting device, and more particularly to a hydraulic cutting device for cutting a raw aluminum material so as to reduce the noise during the cutting process and the cost in that the raw material is saved when the cutting is in process.

2. Description of Related Art

Conventionally, a raw aluminum material, such as a solid cylinder approximately 6 m in length, is transmitted to a cutting bed where a cutting saw blade is provided via a conveying belt. After the raw aluminum material is positioned in the conventional cutting mechanism, a predetermined length of the raw aluminum material is sawed off for a specific purpose. However, there are shortcomings concerning the use of conveying belt and the cutting saw blade. First, during the cutting process, lubricant has to be constantly added to lubricate the cutting process in order to protect the cutting saw blade from overheating, which increases the cost of the entire process. Still, no matter how thin the cutting saw blade is, there is always a portion of the material being wasted during the cutting process, which also increases the cost. Furthermore, during the cutting process, the engagement between the cutting saw blade and the raw aluminum material creates loud noises, which disturbs the nearby surroundings and injures workers such as to be deemed as an occupational hazard.

To overcome the shortcomings, the present invention provides an improved hydraulic cutting device to mitigate the aforementioned problems.

SUMMARY OF THE INVENTION

The primary objective of the present invention is to provide an improved hydraulic cutting device to smoothly cut off with minimal noise the raw aluminum material at a predetermined length.

Another objective of the present invention is to provide a transporting system to incorporate with the hydraulic cutting device to transport the raw aluminum material to proper positions prior to and after the cutting process.

Other objects, advantages and novel features of the invention will become more apparent from the following detailed description when taken in conjunction with the accompanying drawings.

DETAILED DESCRIPTION OF THE PREFERRED EMBODIMENT

Figure 1:
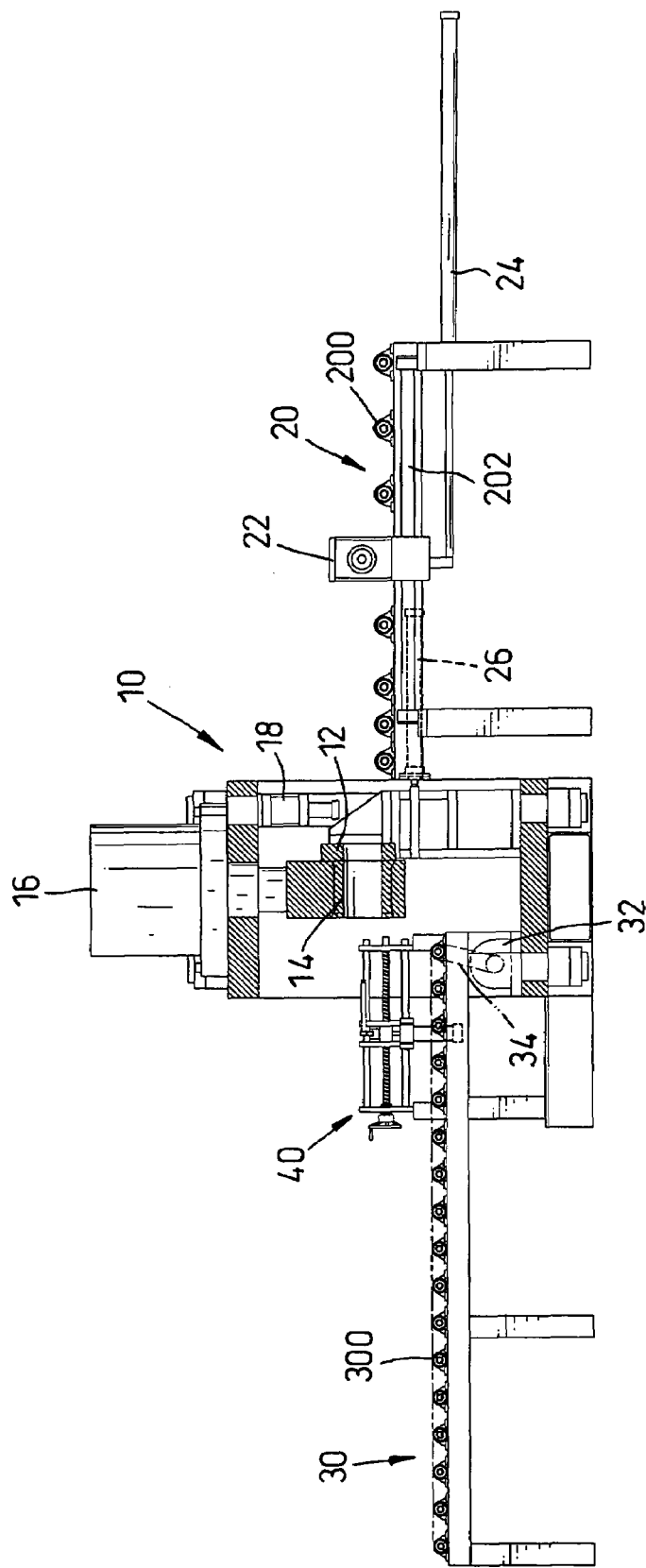
FIG. 1 is a schematic view showing the device of the present invention.

With reference to FIG. 1, the hydraulic cutting device in accordance with the present invention includes a cutting seat (10), an input track (20), an output track (30) and a measuring device (40).

The cutting seat (10) has a fixed cutting block (12) securing and immovably mounted inside the cutting seat (10) and a movable cutting block (14) driven by a master cylinder (16) to move relative to the fixed cutting block (12). A positioning cylinder (18) is mounted beside the fixed cutting block (12).

The input track (20) is provided on one side of the cutting seat (10) and has first rollers (200) securely yet rotatably mounted on the input track (20), a sliding rail (202) mounted on opposite sides of the input track (20) a fixing seat (22) displaceably mounted above the sliding rails (202), a fixing seat cylinder (24) securely mounted under the input track (20) to drive the fixing seat (22) to move along the input track (20) and an output cylinder (26) mounted under the input track (20) and spaced apart from the fixing seat cylinder (24).

The output track (30) is provided on the other side of the cutting seat (10) and has second rollers (300) securely yet rotatably mounted on the output track (30) and a motor (32) mounted under the output track (30) and connected to the second rollers (300) via a chain (34) so that the second rollers (300) are able to be driven by the motor (32).

Figure 3:
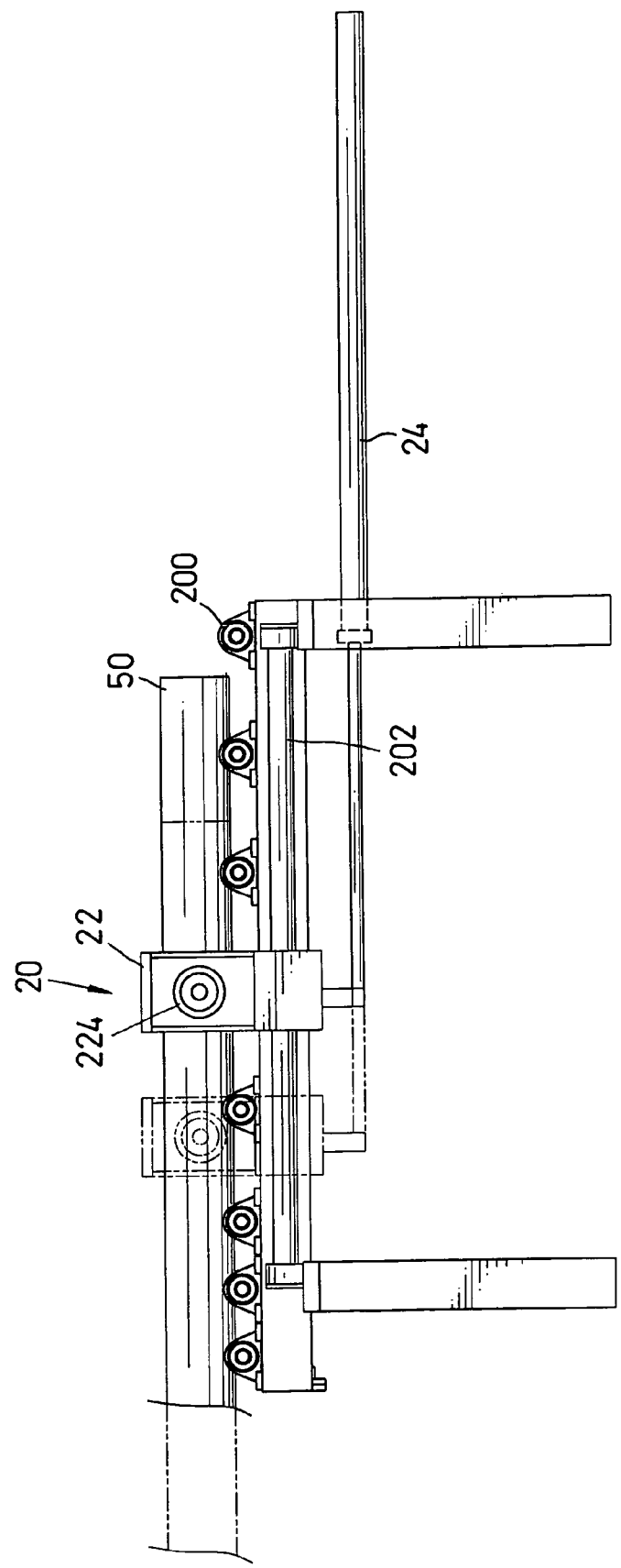
FIG. 3 is a schematic view showing a transporting cylinder is incorporated with the clamping device.
Figure 4:
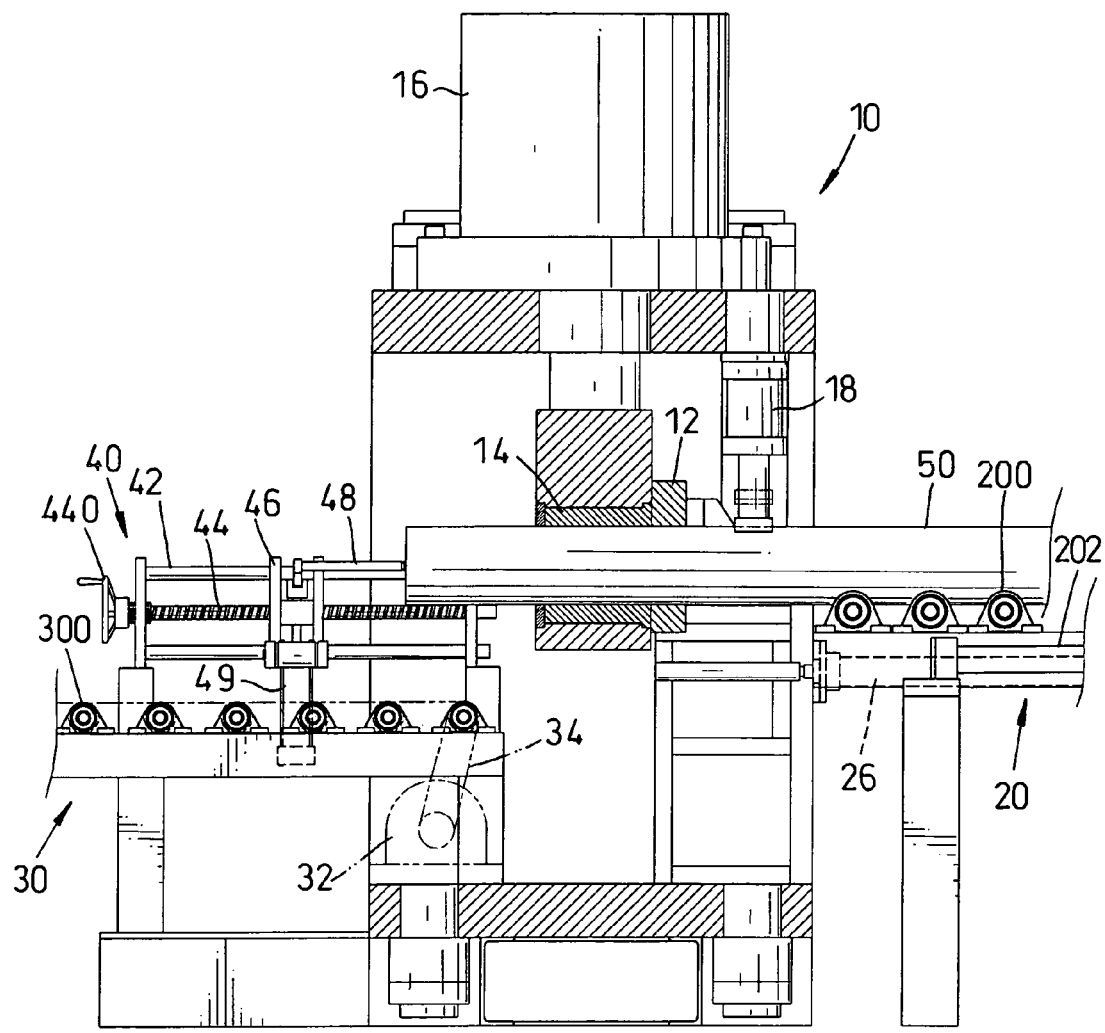
FIG. 4 is a side view showing the relative position between the moving block and the fixed block before the cutting process.
Figure 5:
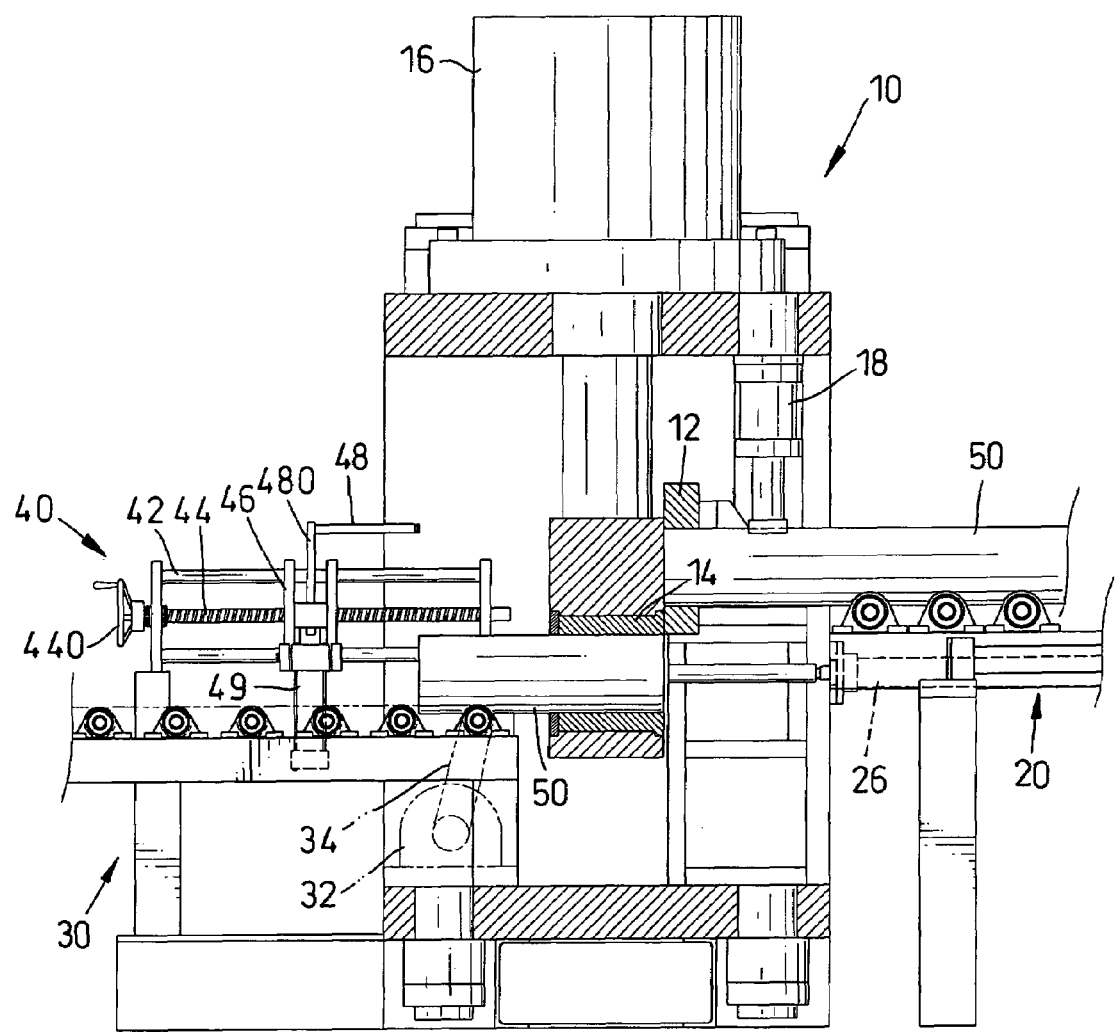
FIG. 5 is a side view showing the relative position between the moving block and the fixed block after the cutting process.
Figure 6:
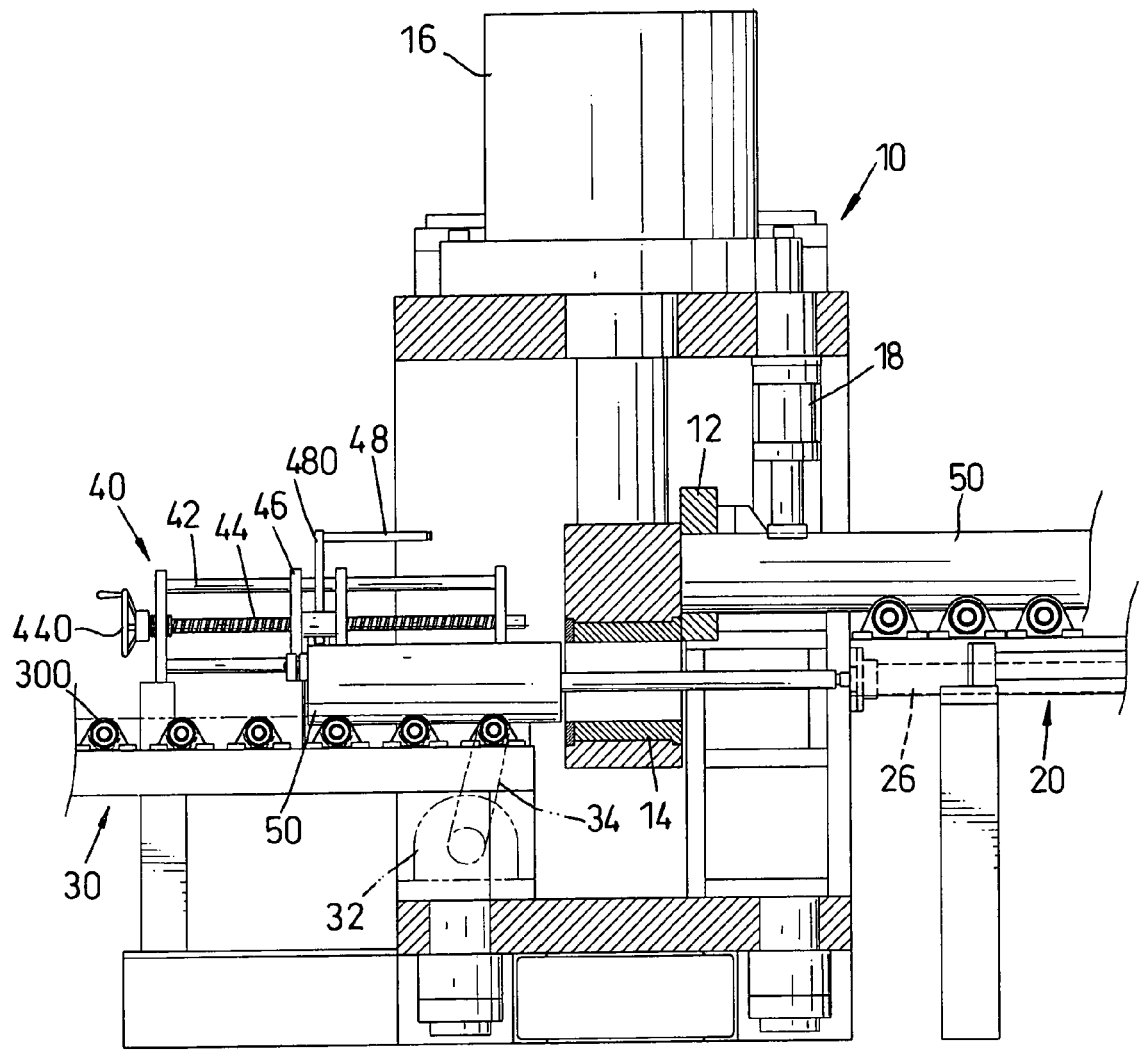
FIG. 6 is a side view showing that the raw aluminum material is transported out of the device.

With reference to FIGS. 3 and 4, the measuring device (40) is mounted on the output track (30) and has a pair of parallel guiding rails (42), a measuring threaded rod (44) extending between the pair of parallel guiding rails (42), an adjusting handle (440) mounted to a distal end of the measuring threaded rod (44), an adjusting seat (46) movably mounted on the measuring device with respect to the pair of parallel guiding rails (42) and the measuring threaded rod (44), an arm (480), as seen in FIGS. 5 and 6, pivotally mounted on the adjusting seat (46) by any known technique and provided with a measuring rod (48) mounted on a free end of the arm (480) and a lifting cylinder (49) mounted on a side of the measuring device (40) and connected to the other free end of the arm (480) so that when the lifting cylinder (49) is activated, the arm (480) is pivoted on the adjusting seat (46) and thus the measuring rod (48) is driven to move accordingly.

Figure 2:
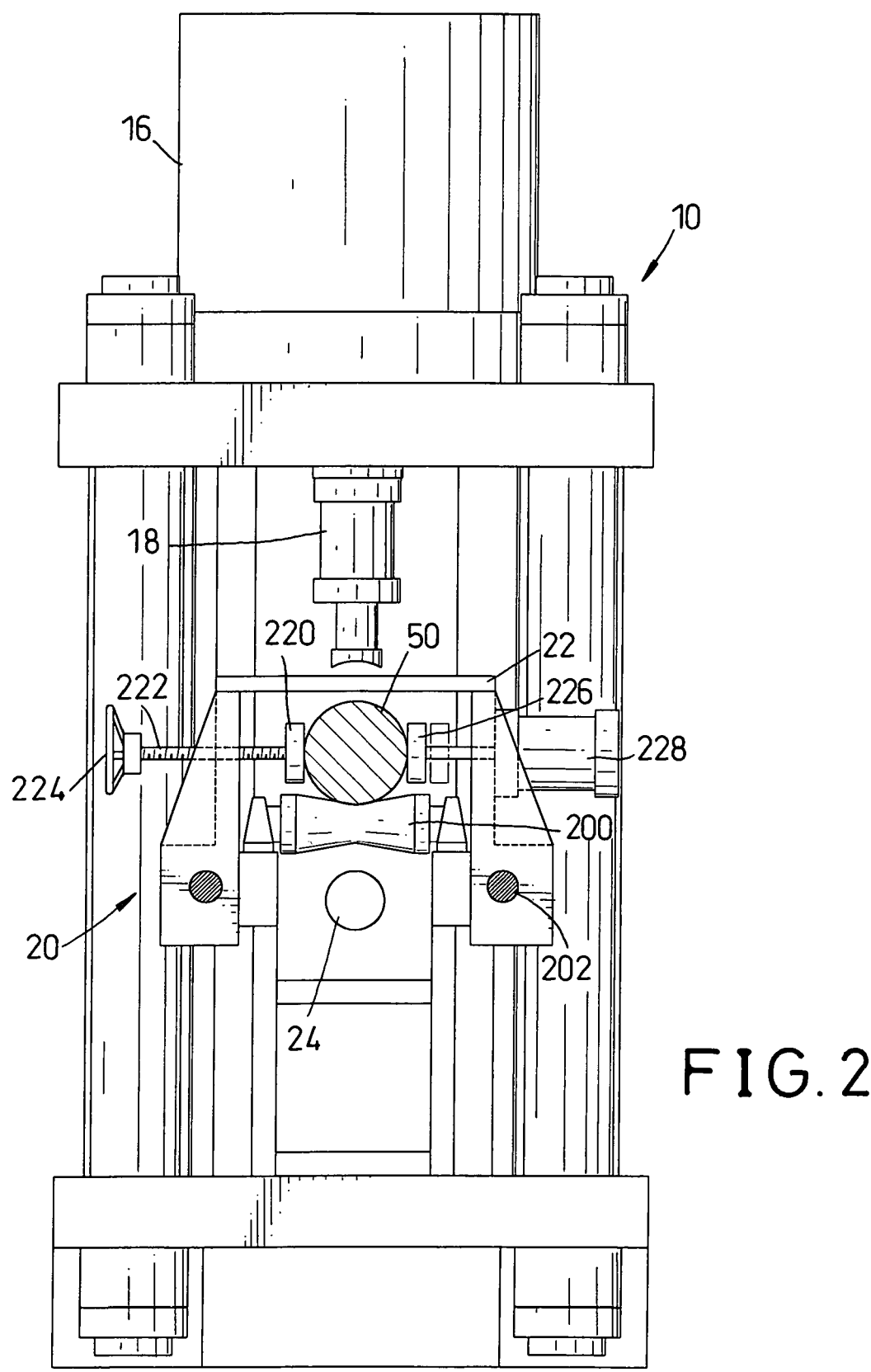
FIG. 2 is a schematic side view showing that the raw aluminum material is securely clamped by the clamping device.

With reference to FIG. 2, the fixing seat (22) is movably mounted on the sliding rails (202) and has a positioning block (220), a threaded rod (222) extending through the fixing seat (22) and having a first free end connected to the positioning block (220) and a second free end connected to a handle (224) so that a position of the positioning block (220) is adjusted by rotation of the handle (224). A clamping block (226) is connected to a clamping cylinder (228) and opposite to the positioning block (220) such that a raw aluminum material (50) placed on the first rollers (200) with a concave middle portion to position the raw aluminum material (50) to prevent the raw aluminum material (50) from undesired rolling is able to be positioned by the positioning block (220) and the clamping block (226) via activation of the handle (224) and the clamping cylinder (228).

With reference to FIG. 3, it is noted that the fixing seat (22) is connected to the fixing seat cylinder (24) so that the fixing seat (22) is able to move along the sliding rails (202)

of the input track (20) to provide a proper positioning effect to the raw aluminum material (50) while being transported to the cutting seat (10).

Referring to FIGS. 4 and 5 again and taking FIG. 2 for reference, when the raw aluminum material (50) is placed on top of the input track (20), the raw aluminum material (50) is first clamped by the positioning block (220) via rotation of the handle (224) and the clamping block (226) via the activation of the clamping cylinder (228). Thereafter, the activation of the fixing seat cylinder (24) will move the fixing seat (22) together with the raw aluminum material (50) toward the cutting seat (10). After the fixing seat (22) and the raw aluminum material (50) enter the cutting seat (10) and a free end face of the raw aluminum material (50) engages with a free end of the measuring rod (48), the measuring rod (48) sends a signal to stop functioning of the fixing seat cylinder (24). The position of the measuring rod (48) can be predetermined according to the desired length of the raw aluminum material (50). After the raw aluminum material (50) reaches the predetermined position via assistance of the measuring rod (48), a portion of the raw aluminum material (50) rests on a joint of the movable cutting block (14) and the fixed cutting block (12). After the raw aluminum material (50) is fixed by the fixing seat (22) and transported to the cutting seat (10), the positioning cylinder (18) is then activated to stabilize the raw aluminum material (50) by the extension of a cylinder rod (not shown). Then, the master cylinder (16) is activated to move the movable cutting block (14) relative to the fixed cutting block (12). Thus, the raw aluminum material (50) is cut off by the movement of the movable cutting block (14) relative to the fixed cutting block (12).

When comparing the positions of the movable cutting block (14), it is noted that the position of the measuring rod (48) in FIG. 4 is lower than the position of the measuring rod (48) in FIG. 5 such that the free end of the measuring rod (48) is able to engage with a side face of the raw aluminum material (50) before the activation of the master cylinder (16). Just before the movement of the master cylinder (16), the lifting cylinder (49) is activated to pivot the arm (480), which drives the measuring rod (48) to move from the position in FIG. 4 to the position in FIG. 5. When the measuring rod (48) is detached from engagement with the raw aluminum material (50), the measuring rod (48) is protected from damage due to the movement of the master cylinder (16).

After the master cylinder (16) reaches the position in FIG. 5, the output cylinder (26) is activated to transport the cut raw aluminum material (50) to the output track (30). Meanwhile, the motor driven second rollers (300) are able to transport the cut raw aluminum material (50) for further work.

With reference to FIG. 6, after the master cylinder (16) reaches the position in FIG. 5, the output cylinder (26) is activated to extend, then retract to resume the original position in FIG. 1 and the master cylinder (16) and the positioning cylinder (18) also retract to their respective original positioning in FIG. 1 for the next process.

It is noted that because the raw aluminum material (50) is cut by hydraulic driven cutting blocks, noise problem can be easily solved. Also, because there is almost no raw material wasted, cost is reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hydraulic cutting device for cutting a raw aluminum material, the hydraulic cutting device comprising:
   a cutting seat having a fixed cutting block securely and immovably mounted inside the cutting seat, a movable cutting block movable relative to the fixed cutting block, and a positioning cylinder mounted beside the fixed cutting block;
   an input track provided on one side of the cutting seat and having first rollers rotatably mounted thereto, a sliding rail mounted on opposite sides of the input track, a fixing seat for supporting the raw aluminum material movably mounted above the sliding rails, a fixing seat cylinder securely mounted under the input track to drive the fixing seat to move along the input track, and an output cylinder mounted under the input track and spaced apart from the fixing seat cylinder to transport the raw aluminum material, the fixing seat including (a) a positioning block, (b) a threaded rod extending out from the fixing seat and having a first free end connected to the positioning block and a second free end connected to a handle so that a position of the positioning block is adjusted by rotation of the handle, and (c) a clamping block connected to a clamping cylinder which is mounted on the cutting seat and disposed opposite to the positioning block such that a raw aluminum material placed on the first rollers is able to be positioned by the positioning block and the clamping block via activation of the handle and the clamping cylinder, the first rollers each being formed with a concave middle portion for receiving the raw aluminum material;
   an output track provided on the other side of the cutting seat and having second rollers rotatably mounted thereto, and a motor mounted under the output track and connected to the second rollers via a chain so that the second rollers are able to be driven by the motor; and
   a measuring device mounted on the output track to determine a length of the raw aluminum material to be cut, the measuring device having a pair of parallel guiding rails, a measuring threaded rod extending between the pair of parallel guiding rails, an adjusting handle mounted to a distal end of the measuring threaded rod, an adjusting seat movably mounted relative to the pair of parallel guiding rails and the measuring threaded rod, an arm with two free ends and pivotally mounted on the adjusting seat and provided with a measuring rod mounted on one of the free ends of the arm, and a lifting cylinder mounted on a side of the measuring device and connected to the other free end of the arm so that when the lifting cylinder is activated, the arm is pivoted on the adjusting seat and thus the measuring rod is driven to move accordingly.

2. The hydraulic cutting device as claimed in claim 1 further comprising a master cylinder operably connected to the movable cutting block to drive the movable cutting block.

* * * * *